(12) United States Patent  (10) Patent No.: US 8,572,113 B2
Fotta et al.  (45) Date of Patent: \*Oct. 29, 2013

(54) NETWORK CALLING PRIVACY WITH RECORDING

(75) Inventors: Keith A. Fotta, Duxbury, MA (US); Richard P. Boudrieau, Duxbury, MA (US); Robert E. Ziemba, Jr., Glen Gardner, NJ (US); Norman M. D'Amours, Falls Church, VA (US)

(73) Assignee: Gryphon Networks Corp., Norwood, MA (US)

( * ) Notice: Subject to any disclaimer, the term of this patent is extended or adjusted under 35 U.S.C. 154(b) by 136 days.

This patent is subject to a terminal disclaimer.

(21) Appl. No.: 12/874,864

(22) Filed: Sep. 2, 2010

(65) Prior Publication Data

US 2012/0059841 A1  Mar. 8, 2012

(51) Int. Cl.
 *G06F 17/30* (2006.01)
(52) U.S. Cl.
 CPC .................................. *G06F 17/30017* (2013.01)
 USPC ........................................................ 707/769
(58) Field of Classification Search
 USPC ......... 707/694, 769, 770, 781, 782, 783, 784; 726/2, 4, 26, 27; 379/188, 200, 201.02, 379/212.01
 See application file for complete search history.

(56) References Cited

U.S. PATENT DOCUMENTS

| | | | |
|---|---|---|---|
| 5,960,073 A | 9/1999 | Kikinis et al. | |
| 5,999,932 A | 12/1999 | Paul | |
| 6,049,782 A | 4/2000 | Gottesman et al. | |
| 6,052,709 A | 4/2000 | Paul | |
| 6,081,591 A | 6/2000 | Skoog | |
| 6,081,592 A | 6/2000 | Battle | |
| 6,092,099 A | 7/2000 | Irie et al. | |
| 6,130,937 A * | 10/2000 | Fotta | 379/200 |
| 6,249,575 B1 | 6/2001 | Heilmann et al. | |
| 6,275,824 B1 * | 8/2001 | O'Flaherty et al. | 1/1 |
| 6,321,267 B1 | 11/2001 | Donaldson | |
| 6,330,317 B1 | 12/2001 | Garfinkel | |
| 6,480,850 B1 * | 11/2002 | Veldhuisen | 707/610 |
| 6,493,007 B1 | 12/2002 | Pang | |
| 6,643,686 B1 | 11/2003 | Hall | |
| 6,788,773 B1 | 9/2004 | Fotta | |
| 6,853,717 B1 | 2/2005 | Frentz et al. | |

(Continued)

FOREIGN PATENT DOCUMENTS

EP  0 946 022 A2  9/1999
WO  WO 98/51062 A1  11/1998

(Continued)

OTHER PUBLICATIONS

VeriSign, Do-Not-Call Compliance, 2004, 2-7.*

(Continued)

*Primary Examiner* — Jean B Fleurantin
(74) *Attorney, Agent, or Firm* — Hamilton, Brook, Smith & Reynolds, P.C.

(57) ABSTRACT

Compliance with a privacy database and call-specific applications is provided within a network. A service control function (SCF), in communication with a privacy database, selectively establishes a call between an origin and a destination. Based on origin or destination identifiers, call parameters are determined for further operations associated with the call. A server, responsive to the call parameters, performs monitoring of the call or post-call disposition to update the privacy database.

70 Claims, 11 Drawing Sheets

(56) References Cited

U.S. PATENT DOCUMENTS

| | | | |
|---|---|---|---|
| 7,020,259 | B2 | 3/2006 | Hussain et al. |
| 7,023,980 | B2 | 4/2006 | Lenard |
| 7,099,444 | B1 | 8/2006 | Russell |
| 7,158,630 | B2 | 1/2007 | Fotta et al. |
| 7,162,474 | B1 | 1/2007 | Harker et al. |
| 7,194,075 | B2 | 3/2007 | Fotta |
| 7,212,620 | B1 | 5/2007 | Mastro |
| 7,215,760 | B2 | 5/2007 | Lenard |
| 7,227,930 | B1 | 6/2007 | Othmer et al. |
| 7,231,029 | B1 | 6/2007 | Kirkpatrick |
| 7,333,798 | B2 | 2/2008 | Hodge |
| 7,412,049 | B1 | 8/2008 | Koch |
| 7,461,263 | B2 | 12/2008 | Prince |
| 7,474,741 | B2 | 1/2009 | Brunson et al. |
| 7,536,437 | B2 | 5/2009 | Zmolek |
| 7,552,058 | B1 | 6/2009 | Zhang |
| 7,574,471 | B2 | 8/2009 | Fotta et al. |
| 8,126,857 | B2 * | 2/2012 | Maitino et al. ............... 707/694 |
| 2002/0075303 | A1 | 6/2002 | Thompson et al. |
| 2002/0152272 | A1 | 10/2002 | Yairi |
| 2002/0169954 | A1 | 11/2002 | Bandini et al. |
| 2003/0041126 | A1 | 2/2003 | Buford et al. |
| 2003/0074286 | A1 | 4/2003 | Rodrigo |
| 2003/0074397 | A1 | 4/2003 | Morin et al. |
| 2003/0093320 | A1 | 5/2003 | Sullivan |
| 2003/0126218 | A1 | 7/2003 | Sakonsaku |
| 2003/0132972 | A1 | 7/2003 | Pang |
| 2003/0135737 | A1 | 7/2003 | Bouthors |
| 2003/0212566 | A1 | 11/2003 | Fergusson et al. |
| 2003/0217079 | A1 | 11/2003 | Bakalash et al. |
| 2004/0066926 | A1 | 4/2004 | Brockbank et al. |
| 2004/0109557 | A1 | 6/2004 | Lenard |
| 2004/0114747 | A1 | 6/2004 | Trandal et al. |
| 2004/0148506 | A1 | 7/2004 | Prince |
| 2005/0031107 | A1 | 2/2005 | Fotta |
| 2005/0074114 | A1 | 4/2005 | Fotta et al. |
| 2005/0144279 | A1 | 6/2005 | Wexelblat |
| 2005/0226151 | A1 | 10/2005 | Fotta et al. |
| 2005/0226221 | A1 | 10/2005 | Fotta et al. |
| 2005/0249209 | A1 | 11/2005 | Fotta et al. |
| 2006/0045070 | A1 | 3/2006 | Fotta |
| 2006/0159060 | A1 | 7/2006 | Fotta et al. |
| 2007/0136789 | A1 | 6/2007 | Fotta |
| 2012/0059860 | A1 | 3/2012 | Fotta et al. |

FOREIGN PATENT DOCUMENTS

| | | | |
|---|---|---|---|
| WO | WO 03/054764 | A1 | 7/2003 |
| WO | WO 03/107644 | A1 | 12/2003 |
| WO | WO 2004/006551 | A1 | 1/2004 |
| WO | WO 2006/115909 | A1 | 11/2006 |
| WO | WO 2006/133337 | A2 | 12/2006 |
| WO | WO 2007/041436 | | 4/2007 |

OTHER PUBLICATIONS

International Search Report and Written Opinion for International Appl. No. PCT/US2011/049995; Mailed: Mar. 2, 2012.
Myers, J., "Network Working Group, Request for Comments," 2222:1-16 (Oct. 1997); http://www.ietf.org/rfc/rfc222.txt, Nov. 11, 2003.
Myers, J., "Network Working Group, Request for Comments," 2554:1-11 (Mar. 1999).
Franks, J., et al., "Network Working Group, Request for Comments," 2617:1-34 (Jun. 1999) http://www.ictf.org/rfc/rfc2617.txt?number=2617, Nov. 11, 2003.
International Search Report from International Application No. PCT/US2006/014584, dated Jul. 27, 2006.
International Search Report from International Application No. PCT/US2006/038322, dated Jan. 22, 2007.
International Search Report from International Application No. PCT/US05/31435 dated Feb. 24, 2006.
*Office Action dated Mar. 21, 2008, issued in U.S. Appl. No. 11/111,494.
*Office Action dated Apr. 21, 2008, issued in U.S. Appl. No. 10/820,452.
*Office Action dated Jul. 20, 2009, issued in U.S. Appl. No. 11/111,494.
*Office Action dated Dec. 28, 2009, issued in U.S. Appl. No. 11/242,614.
*Office Action dated Nov. 13, 2009, issued in U.S. Appl. No. 10/820,452.
Managing inbound spam in Lotus Domino 6, presented by Lotus Developer Domain, pp. 1-28.
InboxMaster™ brochure, from Secluda Technologies, Inc.™ (11 pp) (2003).
"Do Not Call", presented by Mutual of Omaha, pp. 1-4 (2004).
"Do-Not-Call Compliance", presented by VeriSign, pp. 1-7 (2004).
*Office Action, Mail Date Jan. 27, 2009, U.S. Appl. No. 10/820,452.
*Office Action, Mail Date Jan. 9, 2009, U.S. Appl. No. 11/111,494.
*Office Action, Mail Date Jun. 23, 2009, U.S. Appl. No. 11/302,958.
*Office Action dated Feb. 4, 2009 issued in U.S. Appl. No. 11/021,564.
*Office Action dated Oct. 7, 2010, issued in U.S. Appl. No. 10/820,452.
*Office Action dated Oct. 15, 2010, U.S. Appl. No. 11/021,564.
*Office Action dated Aug. 3, 2010, issued in U.S. Appl. No. 11/111,494.
*Office Action dated Aug. 13, 2010, issued in U.S. Appl. No. 11/242,614.
International Preliminary Report on Patentability, International Appl. No. PCT/US2006/014584, issued Oct. 23, 2007.
International Preliminary Report on Patentability, International Appl. No. PCT/US2006/038322, mailed Apr. 17, 2008.
Communication pursuant to Article 94(3) EPC, dated Dec. 3, 2009, EP 06 750 590.9.
*Office Action dated Oct. 27, 2009, U.S. Appl. No. 11/021,564.
*Office Action dated Apr. 26, 2010, U.S. Appl. No. 11/021,564.
*Office Action dated Mar. 11, 2010, U.S. Appl. No. 11/111,494.
*Office Action dated Apr. 12, 2010, U.S. Appl. No. 10/820,452.
*Office Action mail date Jun. 25, 2009, U.S. Appl. No. 11/242,614.
*Office Action mail date Sep. 5, 2012, U.S. Appl. No. 12/957,132.
*Final Office Action mail date Feb. 12, 2013, U.S. Appl. No. 12/957,132, "Network Calling Privacy With Recording,".
Notification of Transmittal of the International Preliminary Report on Patentability for PCT/US2011/049995, "Network Calling Privacy With Recording," mailed Mar. 14, 2013.

* cited by examiner

NETWORK CALLING PRIVACY WITH RECORDING

BACKGROUND

Privacy laws that restrict the ability to make and record telephonic and other communications exist in the United States, as well as other countries, and vary significantly from jurisdiction to jurisdiction.

Certain Do Not Call marketing privacy laws referenced in U.S. Pat. Nos. 6,130,937, 6,788,773, 7,158,630, 7,194,075 and 7,574,471 require marketers to restrict, enable, manage and otherwise apply specific treatment and business processes to marketing communications based on the jurisdiction associated with the party they are communicating with.

These Do Not Call privacy laws dictate, among other things, which communications may be made, the time of day communications may be made, disclosures that must be delivered during communications, data that must be captured during communications, and minimum periods such captured data must be preserved.

Other marketing privacy regulations, including the U.S. Federal Trade Commission's (FTC) Telemarketing Sales Rule, require businesses to audio-record a consumer's telephonic authorization to enter into a transaction, such as a charge or recurring charge to a credit card or other account.

Certain regulatory authorities, including the Financial Industry Regulatory Authority (FINRA) in the United States and Financial Services Authority (FSA) in the United Kingdom, require audio-recording or "taping" of communications related to client orders, negotiations and transactions in the equity, bond and derivatives markets.

Similar statutes and regulations apply to other industries, such as the U.S. Federal Communications Commission's (FCC) "anti-slamming" rules that require telecommunications carriers to obtain and preserve audio verification of orders for telecommunications service for a minimum of two (2) years after obtaining verification.

Certain other consumer privacy laws, including the U.S. federal Telecommunications Act, require the consent of at least one party to a communication in order to allow recording or monitoring of the communication, while other more restrictive U.S. state laws, including California and Connecticut law, only permit monitoring or recording when all parties to the communication have provided consent. Disclosure that a call is or will be recorded or monitored is necessary for consent.

Disclosures of specific information are also required under many other consumer protection laws, including the FTC's Telemarketing Sales Rule, which requires businesses to clearly provide certain information before marketing to a consumer (ex. identify of seller, purpose of the call) or before a consumer pays for goods or services (ex. material restrictions, limitations or terms such as refund policy, negative option features, or number of debits, charges, or payments).

Certain businesses that are not required by law to record or monitor communications voluntarily do so for quality assurance and training purposes, and are thereby subject to privacy laws requiring disclosures and consent from one or more parties to the communication. Businesses required by law to audio-record or tape communications must also comply with these consent and disclosure requirements that vary from jurisdiction to jurisdiction.

Similar privacy laws and industry requirements exist and have been proposed in other jurisdictions, including Australia, Canada and European Union countries, and vary from jurisdiction to jurisdiction.

Similar to Do Not Call privacy laws, businesses using the telephone to contact consumers must restrict, enable, manage and otherwise apply specific treatment and business processes to marketing communications based on the jurisdiction associated with the party they are communicating with and/or the jurisdiction associated with the calls origin.

Preserving the ability to conduct business using the telephone while avoiding fines, criminal penalties and brand damage associated with violating these privacy and consumer protection laws and requirements is a critical and challenging issue for businesses.

SUMMARY

Example embodiments of the present invention provide a system for managing communications in a network. A caller may employ a service provided by example embodiments when initiating an outbound or receiving an inbound communication between an origin (e.g., a "land line" telephone, mobile telephone, or Voice over IP (VoIP) terminal) and a destination.

Example embodiments of the invention may include a Privacy database configured to store call recording rules associated with a plurality of origins and destinations. A service control function (SCF) is configured to selectively establish a call between an origin and a destination based on the status and jurisdiction of the origin and destination indicated in the Privacy database. The SCF is further configured to provide parameters for the call based on the call recording rules. The parameters can include, for example, parameters specifying whether a call may be recorded, whether a disclosure should be delivered, or to record only one of the parties to the call. A server is configured, responsive to the parameters, to selectively record the call, deliver certain disclosures, and report an input to update the Privacy database.

Disclosures (also referred to as "notifications") include information conveyed to one or more parties to a call at the origin and/or destination that a business desires or is required by privacy or consumer protection laws to deliver, including information relating to marketing, call recording, Do Not Call (DNC), legal exemptions, preferences, material terms, payment, or status or jurisdiction of the origin or destination indicated in the Privacy database or a separate storage database. Such disclosures may be delivered before, during or after a call, or may be delivered absent a call if the call is prohibited by a parameter indicated by the Privacy database.

A Privacy database may also include a Call Recording Rules engine with processes and information based on jurisdictions associated with the destination and/or origin of a telephonic communication. This Call Recording Rules engine determines processes to apply to each individual communication based on the communications destination and/or origin jurisdiction, including enabling or prohibiting the communication, enabling or prohibiting recording or other means of capturing the communication, triggering pre- and post-connection electronic notifications or disclosures to one or both parties to the communication, triggering recording or capture of only one or both parties' verbal communication, or enabling the capture (via key press, mouse click or otherwise) or recording of consent, authorization and/or an electronic signature from the called party inbound call (automatically or as initiated by the calling party key press, mouse click or otherwise) to consent to call recording, authorize a transaction(s) and/or create an legal exemption (ex. express consent or written permission) to privacy restrictions, including DNC laws, prerecorded or automated voice message regulations and/or automated dialing equipment regulations, and transmission or associated updates to the Privacy database or a separate storage database.

A Privacy database may also include a Do Not Call Rules engine with processes and information based on jurisdictions associated with the destination of a telephonic communication. This Do Not Call Rules engine determines processes to apply to each individual communication including checking the federal Do Not Call list, appropriate state Do Not Call lists based on jurisdiction, appropriate internal Do Not Call lists as well as any valid exemptions (including but not limited to existing business relationships) that would permit or disallow the call to be completed.

Rules engines within the Privacy database such as the DNC Rules Engine and Recording rules engine may interact with and update each other and storage databases within and outside of the Privacy database to capture and apply parameters to calls. One iteration of this interaction and updating is the capture of a legal exemption to a Do Not Call regulation via a recorded call to update a storage database such that the DNC rules engine applies the exemption to override the Do Not Call regulation during a future communication.

A Privacy database may also include a Data Repository which stores information collected during before, during and/or after a telephone call. The Data Repository allows analysis of the call information at a later time which may result in updates to the Call Recording Rules engine and/or the Do Not Call Rules engine and/or other databases such as $3^{rd}$ party Customer Relationship Management (CRM) databases.

A Call Session Control Function (CSCF) operates within an IP Multimedia Subsystem (IMS) network to determine how a communication is to be routed. The CSCF, in conjunction with a Home Subscriber Server (HSS), and in communication with the Privacy database, is configured to selectively establish or prevent, (as well as provide disclosures before or during) a call between an origin and a destination based on the status and jurisdiction of the origin and/or destination as indicated in the Privacy database. The CSCF is further configured to respond to parameters for the call which may indicate further call processing based on destination status and/or a subscriber status of the origin and/or destination, all of which is based on information provided in the Privacy database.

The CSCF also directs the Media Resource Function (MRF), also referred to as the Media Server, to interact with the origin and/or destination caller. These interactions include recording calls, delivering disclosures and/or listening to and responding to instructions (via key press, mouse click or other action) during or after a call. The media server is configured, responsive to the call parameters, to conduct further processing of the call. For example, the media server may produce a record of the call, such as an audio recording of the call, based on the originating and/or terminating jurisdiction, that is then stored in the Privacy database. The media server may report a code entered following establishment of the call that will also update the Privacy database.

In further embodiments, the CSCF may be configured to consult and interact with additional rules engines and storage databases within the Privacy database and/or other databases such as $3^{rd}$ party Customer Relationship Management (CRM) databases to determine the parameters and treatment to selectively apply to each call based on jurisdiction and/or client or other lists a phone number appears on, such as a DNC list or DNC exemption list.

In still further embodiments, the CSCF may be configured to compare the jurisdiction associated with an origin or destination ID against the Privacy database, the comparison being used to update the call parameters. For example, the jurisdiction status of the origin or destination may be employed by the CSCF to selectively produce a recording of the call, deliver disclosures before or during the call, and may provide for preventing establishment of the call.

In still further embodiments, the Media Server may be instructed by the CSCF to monitor codes pressed before, during and/or following termination of the call. Upon receiving a code entered at the origin or destination, before, during and/or following termination of the call, the media server updates the Privacy database based on the code entered.

In still further embodiments, the CSCF may be configured further to instruct the Media Server to deliver notifications or disclosures to relay certain information to the origin and/or destination or indicate whether certain parameters apply to the call or the call is prohibited based on the status indicated in the Privacy database.

In still further embodiments, the server may be configured, responsive to the call parameters provided by the Privacy database, to report a code entered at the destination following establishment of the call, the code being used (e.g., by the CSCF) to update the Privacy database. The Privacy database may be configured further to include an indication of legal authorizations or communications preferences for a user associated with the origin or destination.

In still further embodiments, the Media Server may be integrated as a component of the CSCF.

In still further embodiments, the Privacy database may be comprised of multiple physical databases that may reside on separate physical devices and in geographically separate locations.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1:
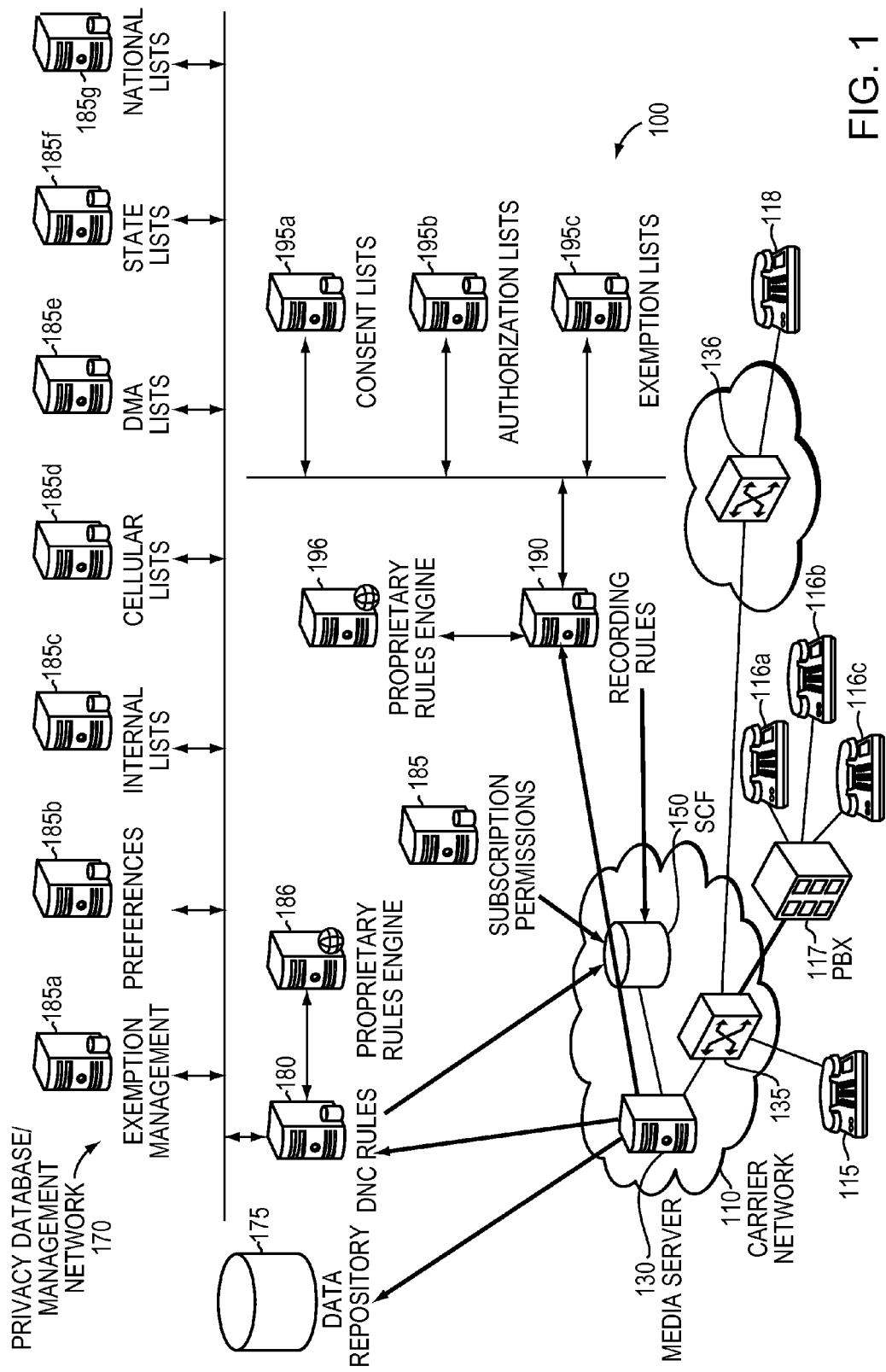
FIG. 1 is block diagram of a network architecture encompassing a system for managing communications.

FIG. 1 illustrates an example communications network 100 implementing a system for managing communications according to an embodiment of the invention. The network 100 generally includes a carrier network 110 to connect a call with end terminals, and a Privacy database 170 (also referred to as a "management network") to manage treatment of a call and additional operations. Some embodiments of the invention may further include components of additional networks, such as a signaling system #7 (SS7) network (not shown), to complete the call and perform call treatment. The network 100 may incorporate features and methods for controlling communications and implementing call compliance as disclosed in U.S. Patent Publications 2007/0136789, 2006/0159060, 2006/0045070, 2005/0226151, 2005/0226221, 2005/0249209, and 2006/0159060, and U.S. Pat. Nos. 6,130,937, 6,788,773, 7,158,630, 7,194,075 and 7,574,471, the entirety of which are incorporated herein by reference.

The carrier network 110 includes a voice switch 135 (also referred to as "switch"), which connects with a number of end terminals that may be employed by an end user to initiate and conduct a call, including a land-line telephone 115 and a plurality of telephones 116a-c connected to the switch 135 via a private branch exchange (PBX) 117. In some embodiments such as a broadband network, the switch may be referred to as the service switching function (SSF), soft-switch, or broadband switch. In further embodiments such as an SS7 network, the switch is commonly referred to as a service switching point (SSP). Also connected to the switch 135 is a server (also referred to as "media server") 130, which is configured to perform functions associated with a call as described in further detail below. A further switch 136, connected to an additional terminal 118, may be a member of the carrier network 110, or may comprise a portion of a second carrier network (not shown).

The carrier network 110 includes a service control function (SCF) 150 operable to establish a call between an origin end terminal (e.g., telephone 115) and a destination end terminal (e.g., telephone 118) by connecting associated switches 135, 136 and the media server 130. In some embodiments, the connection may be established with the use of signal transfer points (STPs) (not shown). During a typical operation to establish a call, an origin end terminal, such as the telephone 115, draws a dial tone and dials a number corresponding to a destination (e.g., telephone 118). The dialed number is forwarded by the switch 135 to the SCF 150. The SCF 150 determines how the call is to be routed between the origin and destination. The SCF 150 routes control messages to the switches 135, 136 selected to carry the voice content of the call. As a result, a call is established between the origin (telephone 115), the destination (telephone 118) and includes the media server 130 as part of the call. Further operations of a typical telecommunications networks are well understood in the art and will not be described further herein.

The Privacy database 170 includes Do Not Call (DNC) rules 180, which maintains and updates entries on contact information (e.g., telephone number) and respective permissions. The DNC rules 180 may be maintained and updated based on information available at one or more data stores 185a-g. The data stores may include exemption management 185a, which indicates exemptions to particular entries on a DNC list; preferences 185b, which indicates particular contact preferences associated with entries; internal lists 185c, which indicates entries specific to a subscriber of a call compliance service, and may include entries provided in response to post-call disposition; cellular lists 185d, which indicates entries for mobile telephone numbers; Direct Marketing Association (DMA) lists 185e, which includes entries of potential customers provided by a third party; state lists 185f, which includes entries corresponding to one or more state DNC list; and national lists 185g, which includes entries corresponding to a national DNC list.

A rules engine 186 processes the entries and information at the data stores 185a-g to determine which entries may be contacted and which entries may not be contacted. This determination provides the DNC rules 180 with a unified set of entries and corresponding permissions. The DNC rules 180, data stores 185a-g and rules engine may incorporate features of a call compliance system as disclosed in U.S. Pat. Nos. 6,130,937, 6,788,773, 7,158,630, 7,194,075 and 7,574,471, the entirety of which are incorporated herein by reference.

The Privacy database 170 further includes recording rules 190, which maintains and updates entries on contact information (e.g., telephone number) and respective permissions. The recording rules 190 may be maintained and updated based on information available at one or more data stores 195a-c. The data stores may include consent lists 195a, which indicates particular contact preferences associated with entries; authorization lists 195b, which indicates relevant laws and regulations associated with a jurisdiction corresponding to entries; and exemption lists 195c, which indicates exemptions to particular entries on a recording permissions list.

A rules engine 196 processes the entries and information at the data stores 195a-c to determine which entries may be contacted and which entries may not be contacted. This determination provides the recording rules 180 with a unified set of entries and corresponding permissions.

The Privacy database 170 further includes a data store for subscription permissions 185. The subscription permissions data store 185 maintains entries associated with a subscriber to services provided by the Privacy database 170, including the automatic number identification (ANI) or telephone numbers of end terminals employed by the subscriber to establish calls. Permissions associated with each of the entries may indicate enforcement of compliance to the DNC rules 180 and recording rules 190, and may further indicate parameters relating to a call. For example, an entry for a subscriber terminal may indicate that, for calls originating from that terminal, the call is to be recorded. This indication is forwarded to the SCF 150, which creates a parameter for an established call based on this indication. As a result, the server 130 conducts a recording of the call. A data repository 175 may be configured to store a recording of the call and other information related to the call.

The network 100 supports for a service providing compliance with privacy and recording laws and DNC regulations, as well as further operations, such as post-call disposition and call monitoring. A subscriber to the service possesses one or more end terminals (e.g., telephones 115, 116a-c) for initiating and receiving calls. Upon enrollment in the service, the subscriber identifies all of the lines at the carrier network 110 that are to be activated for the service. For each of these lines, a trigger is set on the switch 135 to direct the switch to query the SCF 150 when calls are placed from or to that line, and may detect when the service is enabled or disabled. Based on this query, which may indicate the origin ANI and destination number, the SCF 150 evaluates the query against the DNC database 180 and the subscription permissions 185. Based on this evaluation, the SCF 185 determines whether the call will be established, and whether additional call processing will be provided.

Operation and additional features of the service and communications network 100 are described below with reference to FIGS. 2A-B, 3, 4 and 5A-5C. In particular, the network 100 may be configured to conduct one or more of the operations relating to selective establishment of the call, call disposition, and call monitoring as described below. Further, the network 100 may be adapted to one or more communications networks or network technologies, such as an IP multimedia subsystem (IMS) network (see FIGS. 2A-B), a global system for mobile communications (GSM) network (see FIG. 3), a long term evolution (LTE) network (see FIG. 4), and a signaling system #7 (SS7) network (FIGS. 5A-C).

Figure 2A:
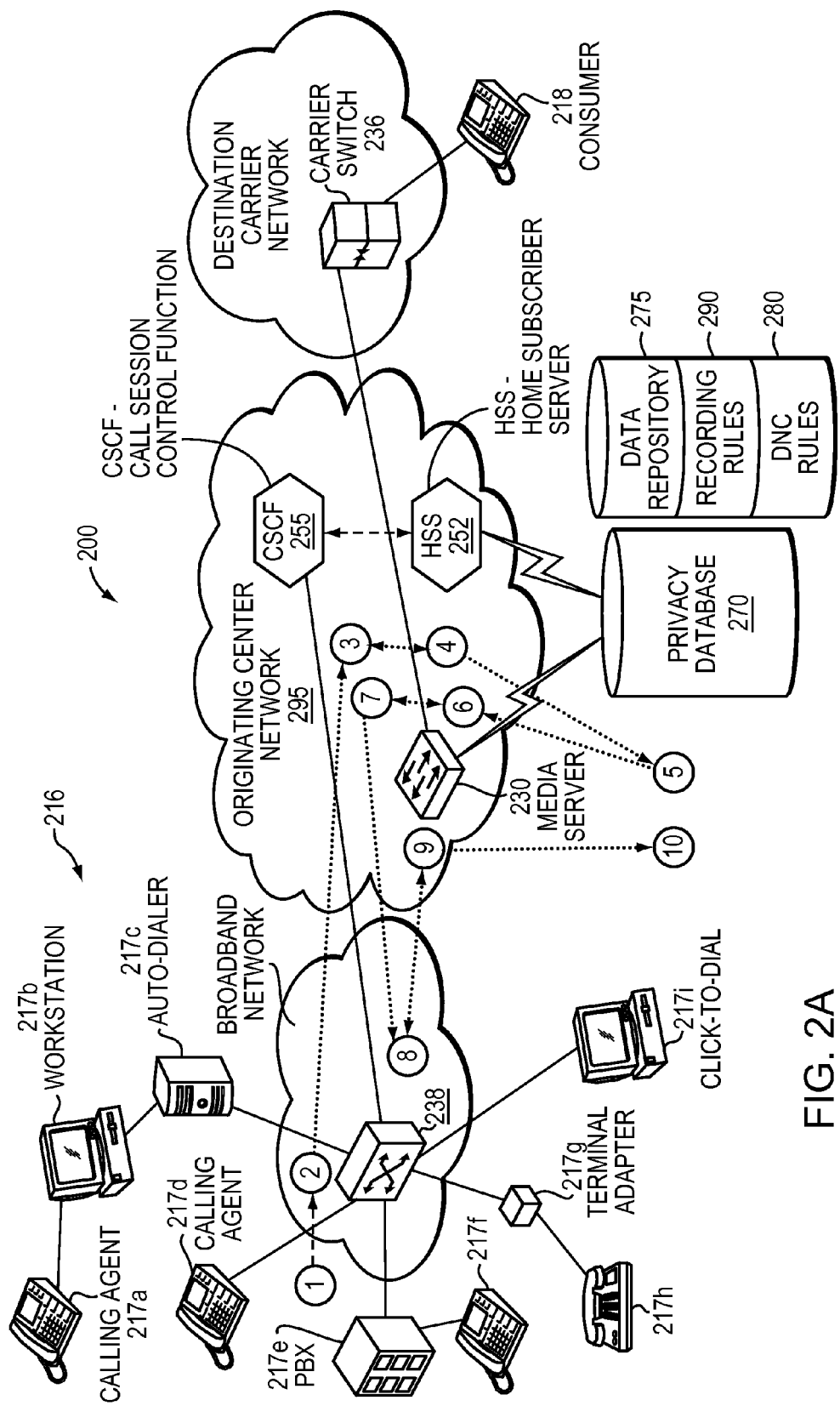
FIG. 2A is a flow diagram illustrating selective establishment and recording of a call in an IP multimedia subsystem (IMS) network according to one embodiment.

FIG. 2A is a flow diagram illustrating selective establishment and recording of a call in an IP multimedia subsystem (IMS) network 200 according to one embodiment. The network 200 may include features and components as described above with reference to FIG. 1. The network 200 includes an origin terminal 216, which may include one or more of a number of networked devices and configurations, such as a land-line telephone 217a connected to a computer workstation 217b and using an automated or predictive dialer 217; a land-line telephone 217d; a land-line telephone 217f connected to a PBX 217e; a telephone 217h connected to a network terminal adapter 217g; and a voice-over-IP (VoIP) click-to-dial computer interface 217i.

The origin terminal 216 connects to an originating carrier network 295 via a router 238 of a broadband network. The broadband router 238 routes IMS related communications to a call service control function 255 (a configured SCF) for establishing a call, and, once a call is established, routes a trunk to a media server 230. The media server 230, in turn, routes the trunk to a second carrier switch 236 at a destination carrier network, the second switch 236 being connected to a destination terminal 218. Alternatively, the media server 230 may be communicatively coupled to an additional switch (not shown), where the additional switch routes the trunk to the second carrier switch 236.

The network 200, through implementation of a Privacy database 270 including a data repository 275, recording rules 290 and DNC rules 280, provides a service to a subscriber at the origin for monitoring of calls and compliance with privacy and DNC regulations. Bypassing of the network service may be enabled on a per-call basis. This may be done by a user at the origin dialing a code that indicates that the dialed number of the next call is not to be processed by the network service.

A process for providing the network DNC service is described below, with reference to the numerals shown in FIG. 2.

1) A calling agent at the origin terminal 216 (connected via a service-subscribed line) dials a number corresponding to the destination 218. If another carrier network (not shown) is the primary carrier for the subscribed line, the agent enters a Carrier Access Code (CAC) to direct the switch to place the call on the appropriate network.

2) The call is held at the broadband switch 238 while the switch 238 generates a call origination request to the call session control function (CSCF) 255 for the subscribed line. When the subscribed line sits behind a PBX 217e, the PBX 217e provides the identification of the subscribed line (e.g. ANI or Calling Party Number) on the PRI D channel so that the switch 235 can generate a call origination query to the CSCF 255 for the appropriate line. The calling party and ANI provided by the PBX may be different numbers. In such a case, the query may be based on calling party number. In alternative embodiments employing a mobile phone at the origin, a Mobile Station ID (MSID) number is the identifier for mobile numbers.

3) The CSCF 255 receives the call origination request and requests data from the home subscriber server (HSS) 252 application servers for subscriber information. The query may identify both the origin and terminating (destination) numbers.

4) The HSS 252 receives the subscriber information request and forwards the request to the Privacy database 270.

5) The Privacy database 270 receives information including both the origination and terminating numbers corresponding to the request.

6) The Privacy database 270 process the request and returns an "allow" or "not-allow" call message to the HSS 252 along with indication on whether call recording is to be performed.

7) The call routing results are sent to the CSCF 255, the CSCF 255 then determining how to route the call and the appropriate media server to bridge onto the call.

8) The broadband switch 238 routes the call to the destination carrier switch 236 and bridges onto the call a media server 230 for call recording or playback of automated messages.

9-10) Once the call is completed, and the contents of the call have been recorded, the media server 230 forwards the file containing the contents of the call to the Privacy database 270 along with identifying information about the call. The contents of the call may be stored to the data repository.

If the call is not allowed (as indicated by a "not-allow" message from the Privacy database 270), the media server 230 receives the call and plays an announcement back to the origin terminal 216 agent that the call is not permitted. The announcement may provide information to an end user regarding compliance with privacy or DNC regulations.

If the call is allowed (as indicated by an "allow" message from the Privacy database 270), the CSCF 255 instructs the switch 238 to establish the call to the terminating number, connecting the call to the destination terminal 218. The call may be routed through the media server 230 (or through a switch (not shown) communicatively coupled to the media server 230) to perform additional functions such as call monitoring and call disposition. Alternatively, the call may be routed to bypass the media server 230. When a call is terminated (i.e. the parties hang up) a message containing information about the call is generated by the switch 238 or by the media server 230. This message may be processed at a later time by the carrier network, and those messages associated with the network DNC service are forwarded to Privacy database 270. These messages provide call information such as whether or not the call was answered and the length of the call. Additional functions, such as call disposition and monitoring, may also be performed in the network 200 and are described below with reference to FIGS. 5A-C. In some embodiments such as IP Multimedia Subsystem (IMS) networks, these messages may be referred to as web services or Application Programming Interface (API) calls. In other embodiments such as SS7 networks, these messages may be referred to as Call Detail Records (CDRs).

Figure 2B:
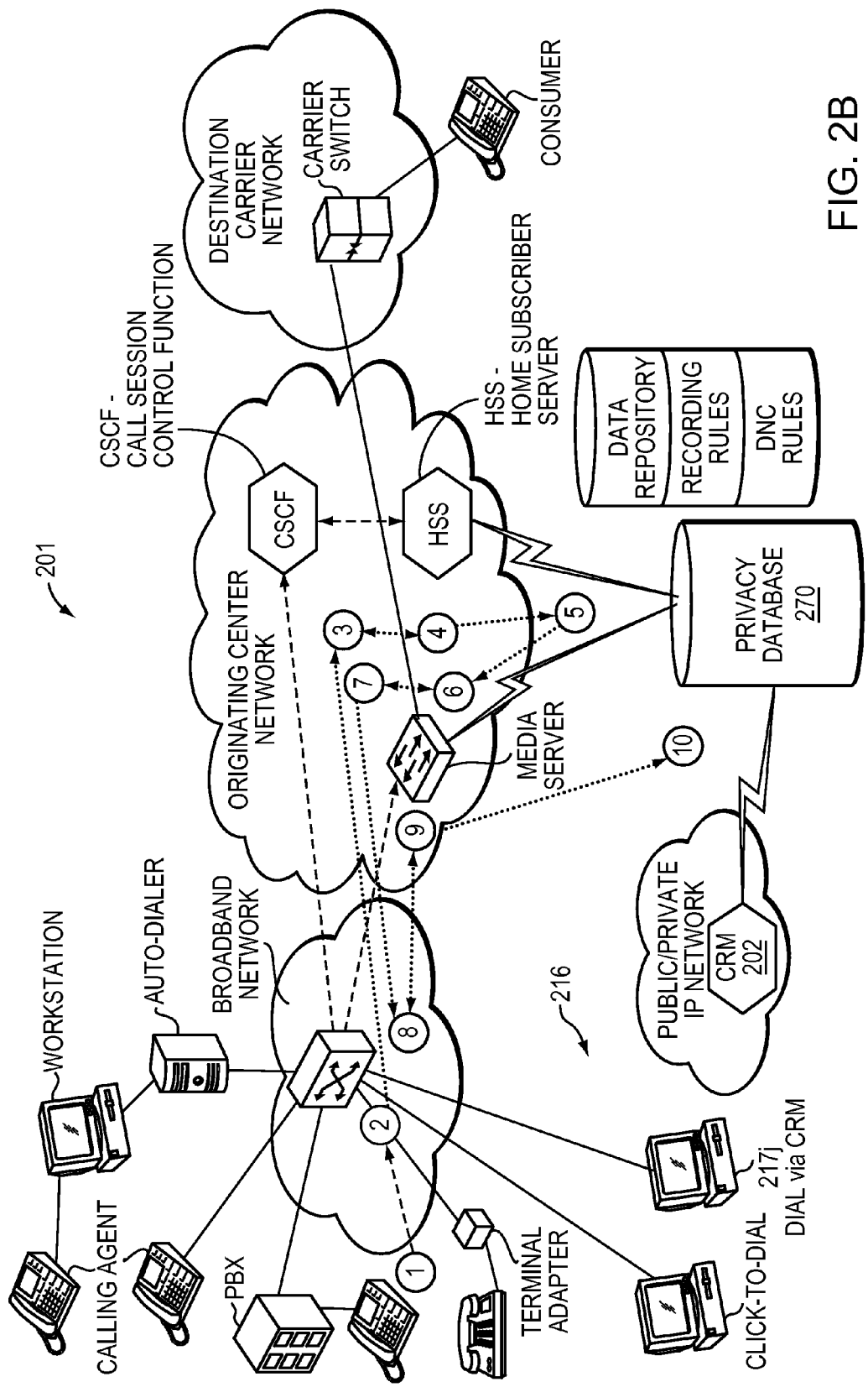
FIG. 2B is a flow diagram illustrating selective establishment and recording of a call in an IP multimedia subsystem (IMS) network and a customer relationship management (CRM) network according to one embodiment.

FIG. 2B is a flow diagram illustrating selective establishment and recording of a call in an IP multimedia subsystem (IMS) network 201 and a customer relationship management (CRM) network 202 according to one embodiment. The network 201 may be configured as the network 200 described above with reference to FIG. 2A, with the addition of a CRM network 202 in communication with the Privacy database 270. The CRM database 202 stores and manages entries on clients and/or prospective clients for a subscriber to the network privacy and DNC service. For example, the CRM database may maintain information on clients in a relational manner including contact information, contact preferences, transaction records, and previous interactions with the client. The CRM database 202 may update this information based on information in the Privacy database 270, including contact preferences (e.g., records of post-call disposition) and call information such as a recording of the call or a time and duration of the call.

An origin terminal 216, such as a computer interface 217*j* in communication with the CRM network 202, may import the CRM data to inform future calls to a present or prospective client.

Figure 3:
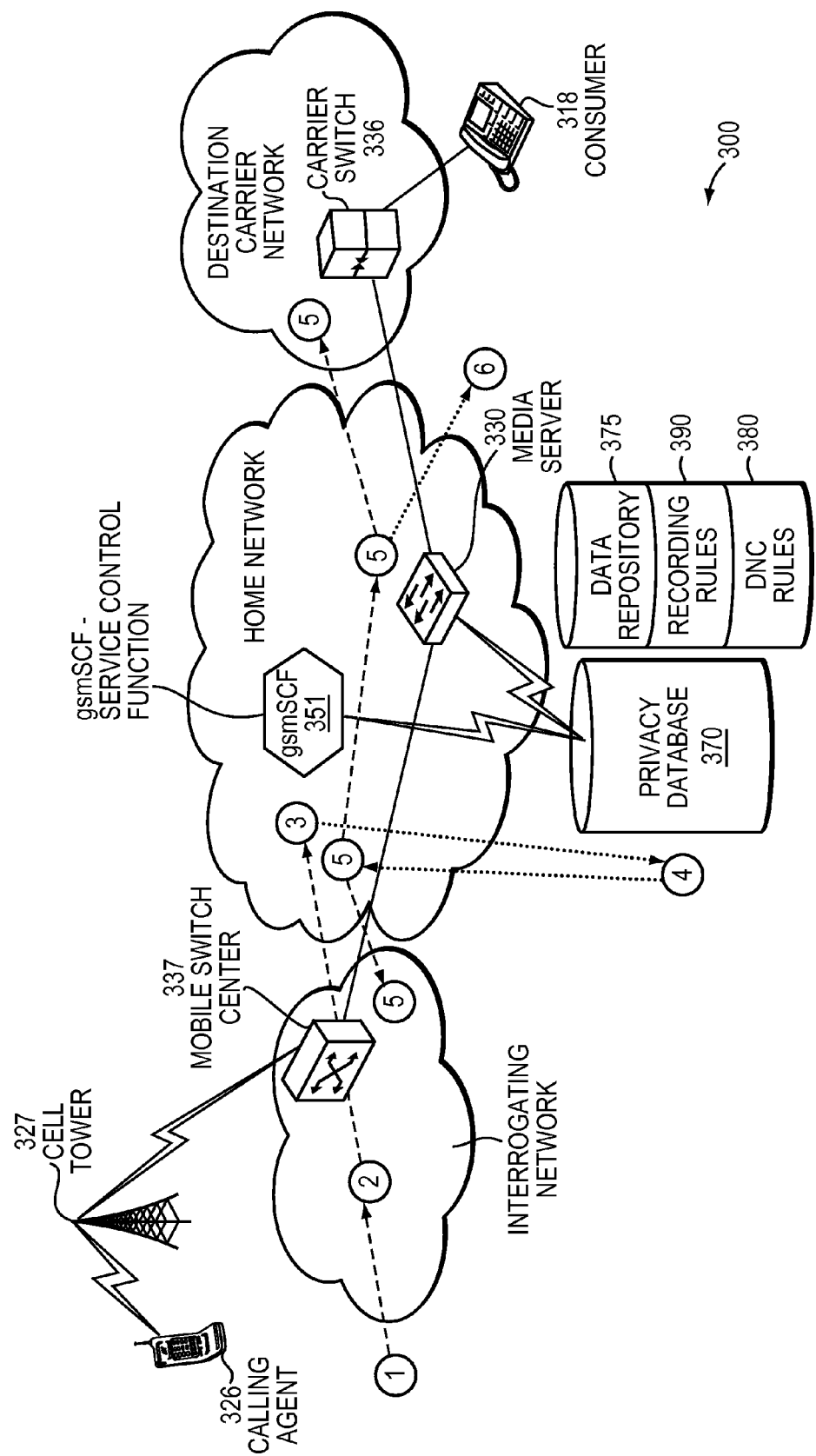
FIG. 3 is a flow diagram illustrating selective call recording in a global system for mobile communications (GSM) network according to one embodiment.

FIG. 3 is a flow diagram illustrating selective call recording in a global system for mobile communications (GSM) wireless network 300 according to one embodiment. The network 300 may include features and components described above with reference to FIGS. 2A-B, with the exception of a wireless network architecture, including a wireless tower 327 and mobile switching center 337, to support a wireless subscriber line at a mobile terminal 326. A process for providing a network DNC service with wireless call recording is described below, with reference to the numerals shown in FIG. 3.

1) A calling agent at the origin terminal 326 (connected via a service-subscribed line) dials a number corresponding to the destination 318. The originating call can be placed from either the home carrier network or a visiting/roaming carrier network.

2) The call is held at the mobile switch 337 while the switch 337 generates a call origination query to the Global System for Mobile communication System Control Function (gsmSCF) 351 of the home network for the subscribed line.

3) The gsmSCF 351 receives the call origination query and sends a call certification query to the Privacy database 370; information sent to the Privacy database 370 include both the origination and terminating numbers.

4) The Privacy database 370 processes the request and send back "allow" or "not-allow" call message as well as an indication of whether or not call recording should be implemented.

5) The call routing results are then used by the gsmSCF 351 to direct the mobile switch 337 with routing instructions to complete the call and to bridge the media server 330 onto the call for call recording.

6) Once the call is completed and the entire contents of the call have been recorded, the media server 330 forwards a file containing the contents of the call to the Privacy database along with identifying information about the call.

Figure 4:
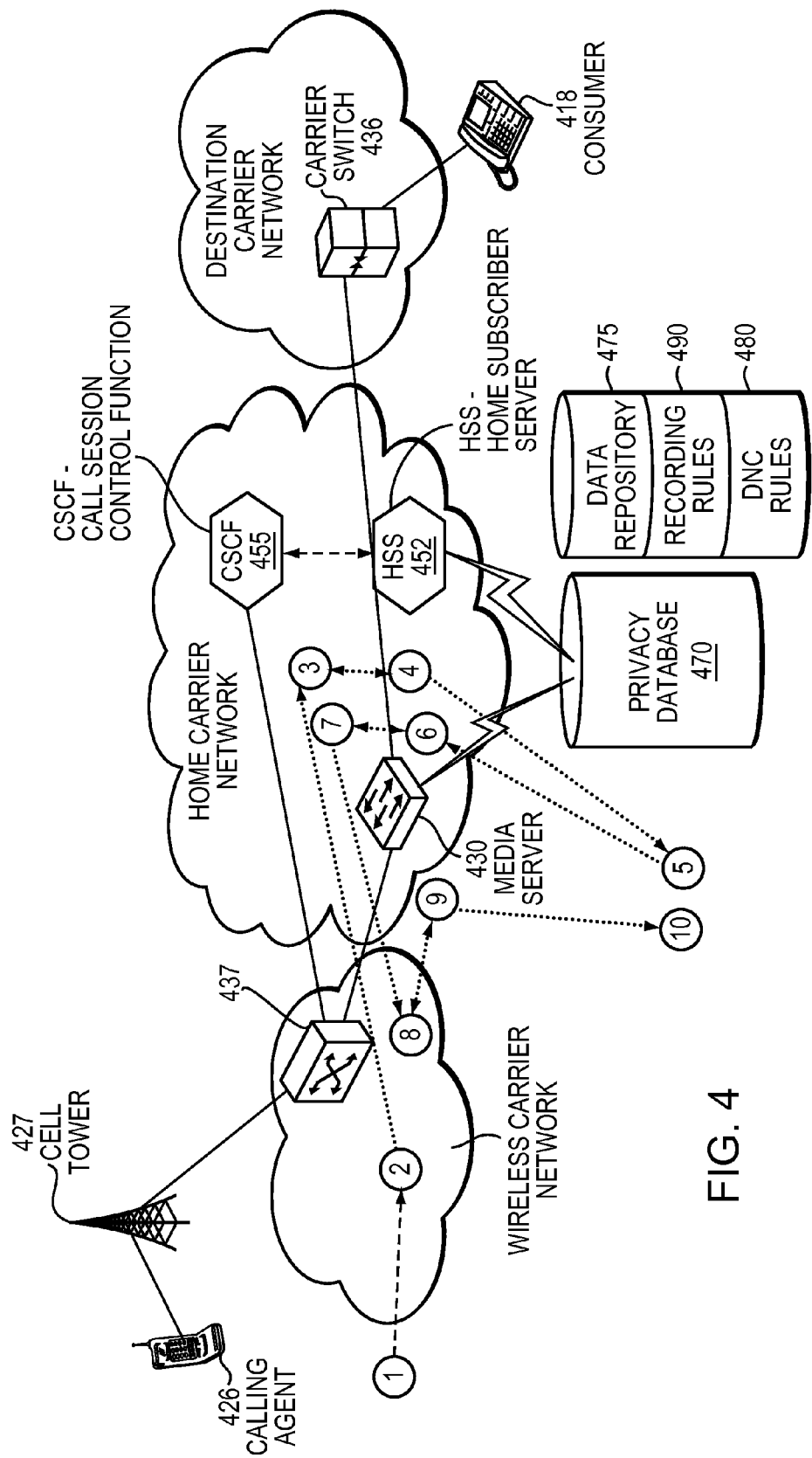
FIG. 4 is a flow diagram illustrating selective call recording in a long term evolution (LTE) network according to one embodiment.
Figure 5A:
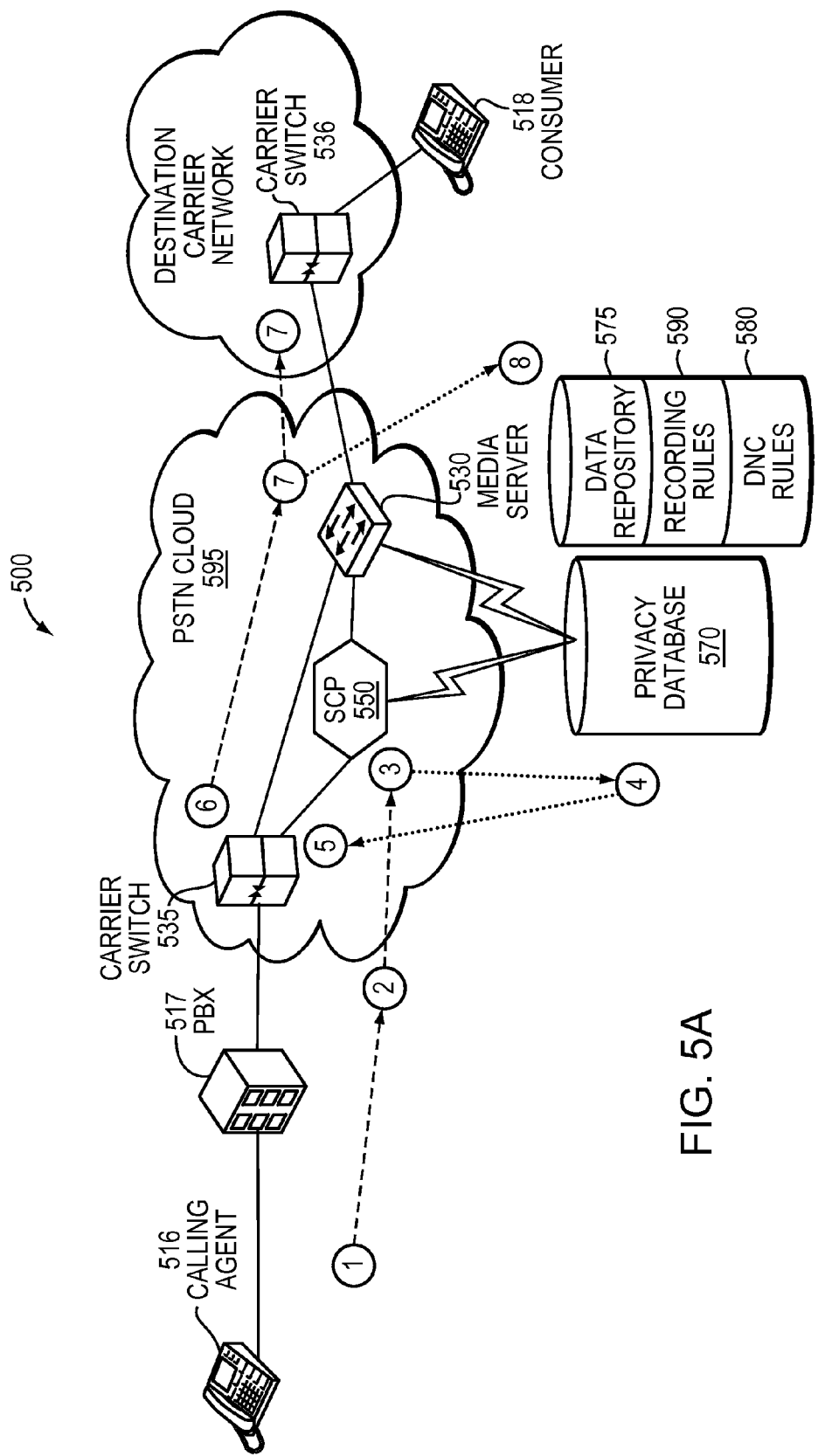
FIGS. 5A-C are flow diagrams illustrating call monitoring and disposition in a signaling system #7 (SS7) network according to a plurality of embodiments.
Figure 5B:
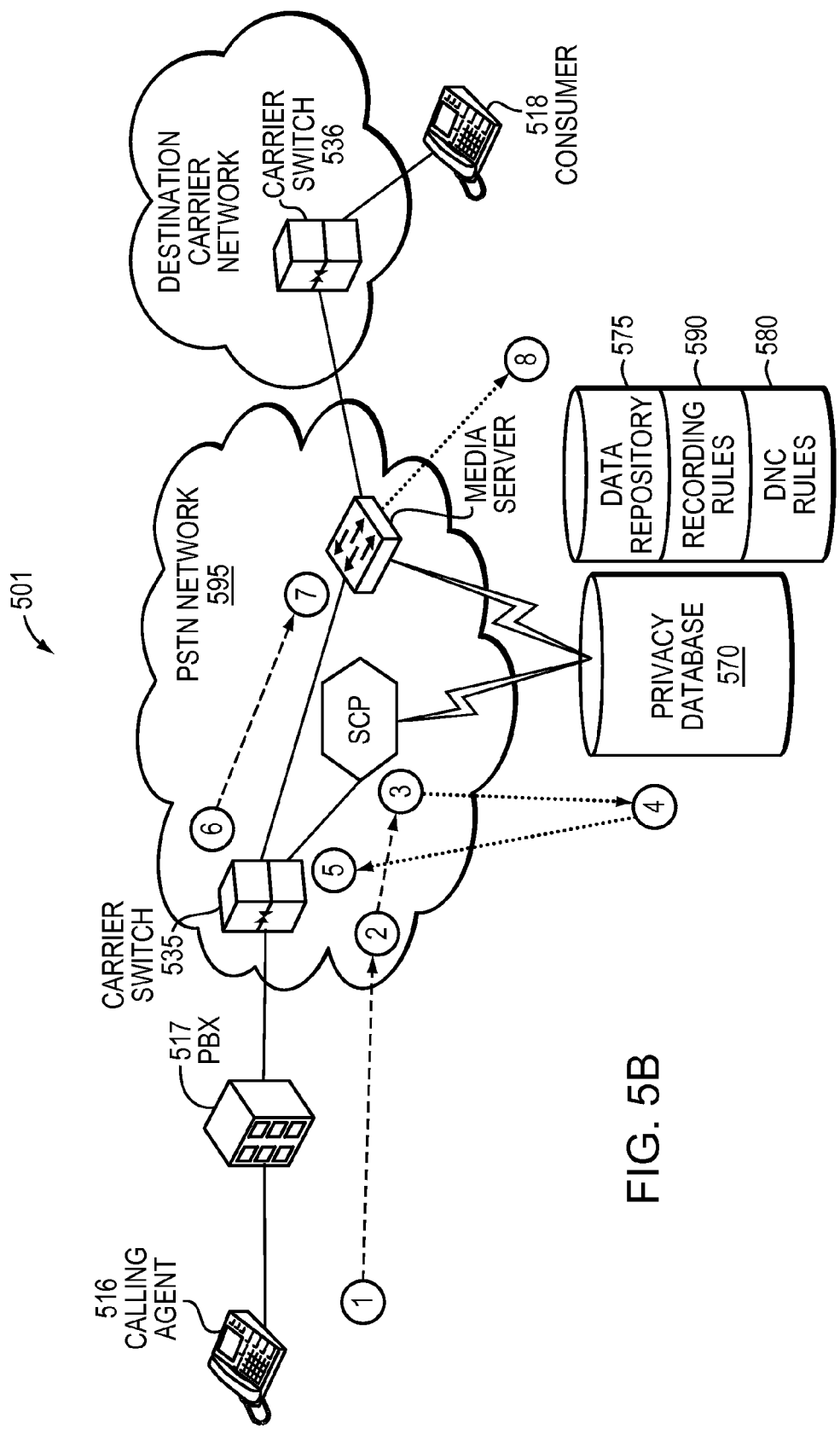
Figure 5C:
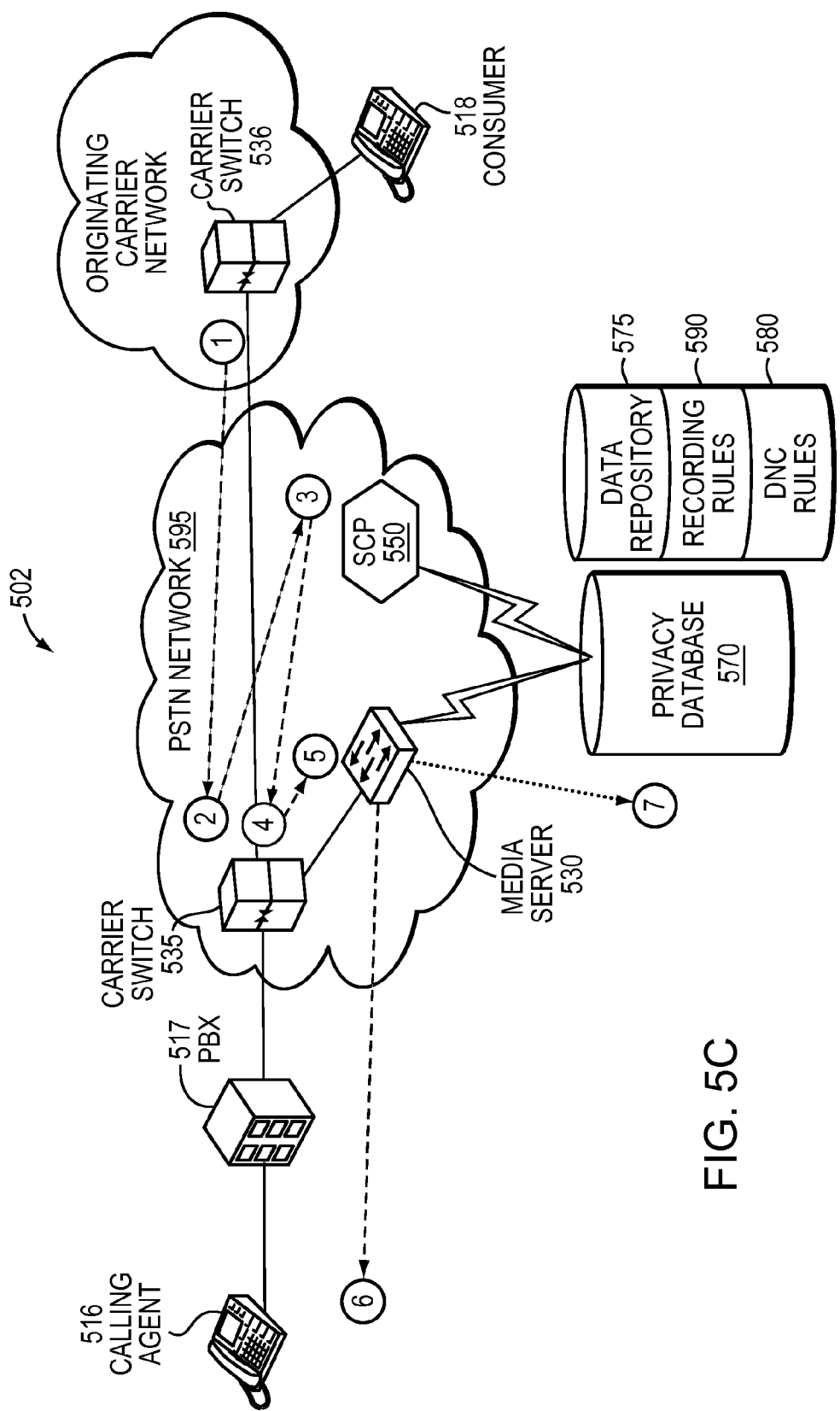

FIG. 4 is a flow diagram illustrating selective call recording in a long term evolution (LTE) network 400 according to one embodiment. The network 400 may include features and components described above with reference to FIGS. 2A-B, with the exception of a wireless network architecture such as that described above with reference to FIG. 3, including a wireless tower 427 and mobile switching center 437, to support a wireless subscriber line at a mobile terminal 426. A process for providing a network DNC service with wireless call recording is described below, with reference to the numerals shown in FIG. 4.

1) A calling agent at the origin terminal 416 (connected via a service-subscribed line) dials a number corresponding to the destination 418.

2) The call is held at the broadband switch 438 while the switch 438 generates a call origination request to the call session control function (CSCF) 455 for the subscribed line. A Mobile Station ID (MSID) number may be the identifier for mobile numbers.

3) The CSCF 455 receives the call origination request and requests data from the home subscriber server (HSS) 452 application servers for subscriber information. The query may identify both the origin and terminating (destination) numbers.

4) The HSS 452 receives the subscriber information request and forwards the request to the Privacy database 470.

5) The Privacy database 470 receives information including both the origination and terminating numbers corresponding to the request.

6) The Privacy database 470 process the request and returns an "allow" or "not-allow" call message to the HSS 452 along with indication on whether call recording is to be performed.

7) The call routing results are sent to the CSCF 455, the CSCF 455 then determining how to route the call and the appropriate media server to bridge onto the call.

8) The broadband switch 438 routes the call to the destination carrier switch 436 and bridges onto the call a media server 430 for call recording or playback of automated messages.

9-10) Once the call is completed, and the contents of the call have been recorded, the media server 430 forwards the file containing the contents of the call to the Privacy database 470 along with identifying information about the call. The contents of the call may be stored to the data repository.

FIG. 5A is a flow diagram illustrating outbound call monitoring in a signaling system #7 (SS7) network 500 according to one embodiment. The network 500 may include features and components as described above with reference to FIGS. 1, 2A-B, 3 and 4. The network 500 includes an origin terminal 516 (e.g., a land-line telephone) connected to a public switched telephone network (PSTN) "cloud" 595 via a PBX 517. In other embodiments, a wireless mobile telephone or VoIP telephone, with associated network elements, may be employed as the origin. A carrier switch 535 (Service Switching Point (SSP)) routes SS7 communications to an SCF 550 (e.g., a service control point (SCP)) for establishing a call, and, once a call is established, routes a voice trunk to a media server 530. The media server 530, in turn, routes the voice trunk to a second carrier switch 536 across the PSTN cloud, the second PSTN switch being connected to a destination terminal 518. Alternatively, the media server 530 may be communicatively coupled to an additional switch (not shown), where the additional switch routes the voice trunk to the second carrier switch 536.

When call recording is provided, and a call is originated from the subscribed line (origin terminal 516), the carrier switch 535 connects the call with a media server 530 such that the media server may monitor and generate an audio recording of the call. Once recorded, the contents of the call, as well as additional information about the call (e.g., origin number, destination number, time and date) may be forwarded to the Privacy database 570 for storage and analysis. The Privacy database 570 may include an entry indicating which of the subscribed lines include the call recording feature, indicating to the SCF 550 to enable the feature.

The network 500, through implementation of a Privacy database 570 including a DNC database 580, provides a service to a subscriber at the origin for compliance with DNC regulations and call recording. A process for providing the network DNC service with call recording is described below, with reference to the numerals shown in FIG. 5A.

1) A calling agent at the origin terminal 516 (connected via a service-subscribed line) dials a number corresponding to the destination 518. If another carrier network (not shown) is the primary carrier for the subscribed line, the agent enters a Carrier Access Code (CAC) to direct the switch to place the call on the appropriate network.

2) The call is held at the carrier switch 535 while the switch 535 generates a call origination query to the SCF 550 for the subscribed line. When the subscribed line sits behind a PBX 517, the PBX 517 provides the identification of the subscribed line (e.g. ANI or Calling Party Number) on the PRI D channel so that the switch 535 can generate a call origination query to the SCF 550 for the appropriate line. The calling party and ANI provided by the PBX may be different numbers. In such a case, the query may be based on calling party number. In alternative embodiments employing a mobile phone at the origin, a Mobile Station ID (MSID) number is the identifier for mobile numbers.

3) The SCF 550 receives the call origination query and sends a call certification query to the Privacy database. The query may identify both the origin and terminating (destination) numbers.

4) The Privacy database 570 process the call certification query and returns an "allow" or "not-allow" call message to the SCF 550, along with call parameters indicating additional service features (e.g., call monitoring, call disposition) to be performed.

5) The call routing results are sent from the SCF 550 back to the carrier switch 535, and the call is processed (i.e., established or not established) by the switch 535 based on the SCF 550 call routing information.

6) The carrier switch 550 routes the call to a media server 530 in the PSTN cloud 595 in response to the SCF 550 indicating that the call needs to originate through a media server 530 (e.g., for call monitoring or playback of automated messages).

7) If the call is not allowed (as indicated by a "not-allow" message from the Privacy database 570), the media server 530 receives the call and plays an announcement back to the origin terminal 516 agent that the call is not permitted. The announcement may provide information to an end user regarding compliance with DNC regulations.

If the call is allowed (as indicated by an "allow" message from the Privacy database 570), the SCF 550 instructs the carrier switch 535 to establish the call to the terminating number, connecting the call to the destination terminal 518. The media server 530 may be connected in-line with the voice trunk of the call, or may be otherwise in communication with the carrier switches 535, 536 in a manner enabling recording of the call.

8) Once the call is completed and the media server 530 has recorded the entire contents of the call, the media server forwards the file containing the contents of the call to the Privacy database 570 along with identifying information about the call, such as the originating number, the terminating number and with the date and time of the call.

FIG. 5B is a flow diagram illustrating call disposition in a signaling system #7 (SS7) network 501 according to one embodiment. The network 501 may be configured in a similar manner as the SS7 network 500 described above with reference to FIG. 5A, and may include features and components as described above with reference to FIGS. 1A, 1B and 2. The network 500 includes a origin terminal 516 (e.g., a land-line telephone) connected to a public switched telephone network (PSTN) "cloud" 595 via a PBX 517. In other embodiments, a wireless mobile telephone or VoIP telephone, with associated network elements, may be employed as the origin. A carrier switch 535 (SSP) routes SS7 communications to an SCF 550 for establishing a call, and, once a call is established, routes a voice trunk to a media server 530. The media server, in turn, routes the voice trunk to a second carrier switch 536 across the PSTN cloud, the second PSTN switch being connected to a destination terminal 518.

When call disposition is provided (e.g., as a feature of a network DNC service), and a call is originated from the subscribed line (origin terminal 516), the carrier switch 535 connects the call with a media server 530 so that dual-tone multi-frequency signaling (DTMF) tones can be detected during the call, the DTMF tones indicating the call disposition. For example, a dialed code "#0" would indicate that the dialed number should be added to the internal DNC list (e.g., list 185*c* in FIG. 1) for the subscriber. The Privacy database 570 may include an entry indicating which of the subscribed lines include the call disposition feature, indicating to the SCF 550 to enable the feature.

The network 501, through implementation of a Privacy database 570 including a DNC database 580, provides a service to a subscriber at the origin for compliance with DNC regulations and call disposition. A process for providing the network DNC service with call disposition is described below, with reference to the numerals shown in FIG. 5B.

1) A calling agent at the origin terminal 516 (connected via a service-subscribed line) dials a number corresponding to the destination 518. If another carrier network (not shown) is the primary carrier for the subscribed line, the agent enters a Carrier Access Code (CAC) to direct the switch to place the call on the appropriate network.

2) The call is held at the carrier switch 535 while the switch 535 generates a call origination query to the SCF 550 for the subscribed line. When the subscribed line sits behind a PBX 517, the PBX 517 provides the identification of the subscribed line (e.g. ANI or Calling Party Number) on the PRI D channel so that the switch 535 can generate a call origination query to the SCF 550 for the appropriate line. The calling party and ANI provided by the PBX may be different numbers. In such a case, the query may be based on calling party number. In alternative embodiments employing a mobile phone at the origin, a Mobile Station ID (MSID) number is the identifier for mobile numbers.

3) The SCF 550 receives the call origination query and sends a call certification query to the Privacy database. The query may identify both the origin and terminating (destination) numbers.

4) The Privacy database 570 process the call certification query and returns an "allow" or "not-allow" call message to the SCF 550, along with call parameters indicating additional service features (e.g., call monitoring, call disposition) to be performed.

5) The call routing results are sent from the SCF 550 back to the carrier switch 535, and the call is processed (i.e., established or not established) by the switch 535 based on the SCF 550 call routing information.

6) The carrier switch 550 routes the call to a media server 530 in the PSTN cloud 595 in response to the SCF 550 indicating that the call needs to originate through a media server 530 to provide call disposition, as well as other possible functions (e.g., call monitoring or playback of automated messages).

7) If the call is not allowed (as indicated by a "not-allow" message from the Privacy database 570), the media server 530 receives the call and plays an announcement back to the origin terminal 516 agent that the call is not permitted. The announcement may provide information to an end user regarding compliance with DNC regulations.

If the call is allowed (as indicated by an "allow" message from the Privacy database 570), the SCF 550 instructs the carrier switch 535 to establish the call to the terminating number, connecting the call to the destination terminal 518. The media server 530 may be connected in-line with the voice trunk of the call, or may be otherwise in communication with the carrier switches 535, 536 to monitor the call for DTMF tones.

8) When the media server 530 detects a call disposition event (e.g., a compliant DTMF code) during a call, the server 530 generates and forwards a message to the Privacy database 570 that provides the disposition code entered as well as the originating number, terminating number and date and time of the call during which the DTMF code was entered.

The network 501 may be configured to perform additional operations, such as call recording, as described below with reference to FIGS. 5A and 5C.

In some embodiments, a network may be configured to selectively monitor and generate a recording of a call across the network. Call recording may be conducted, for example, to monitor a subscriber's compliance with relevant business practices and regulations. To accomplish call recording for a call initiated by a subscriber (an outbound call), a query to a Privacy database may include a query as to whether the call should be recorded. If the answer to the query is positive, then a media server may be implemented to record the call. To accomplish call recording for a call to a subscriber, initiated by an outside line (an inbound call), a carrier switch may be configured with a "trigger" to initiate a query similar to that described above. FIGS. 4A-4E illustrate various methods of call recording, and are described below.

FIG. 5C is a flow diagram illustrating inbound call monitoring in a signaling system #7 (SS7) network 502 according to one embodiment. The network 502 includes the same features and components described above with reference to FIG. 5B, yet is configured to establish and record an inbound call to a subscriber line (terminal 516) from an outside line (terminal 518). To process such incoming calls, a Terminating Attempt Trigger (TAT) (not shown) is set at the carrier switch 535, and directed to the subscribed line, such that when a call is set to terminate on a subscribed line, the carrier switch 535 will hold the incoming call while a query to the SCF 550 is made to determine if the call should be recorded. If the call is to be recorded, the response by the SCF will indicate to the carrier switch 535 to route the call through a media server 530 so that the call can be recorded. A process for providing the network DNC service with inbound call recording is described below, with reference to the numerals shown in FIG. 5C.

1) An outside phone terminal 518 line places a call on a respective DID line to a subscriber terminal 516.

2) A Terminating Attempt Trigger "TAT" is set on the subscriber line such that, responsive to the call, the carrier switch 535 holds the call for additional call processing rules.

3) The carrier switch 535 places a query to the SCF 550 for additional call processing rules.

4) Results of the query, indicating call routing instructions, are sent from the SCF 550 back to the carrier switch 535. The carrier switch 535 routes the call based on the SCF 550 call routing information.

5) The carrier switch 535 routes the call to a media server 530 in the PSTN cloud 595 in response to the SCF 550 indicating that the call needs to originate through the media server 530 for call recording.

6) The media server 530 receives the call and completes the second leg of the call to the terminal 516, thereby establishing the call. The media server initiates recording of the call.

7) Once the call is completed and the media server 530 has completed an audio recording of the call, a file containing the contents of the call are forwarded to the Privacy database 570 along with identifying information about the call.

Figure 6A:
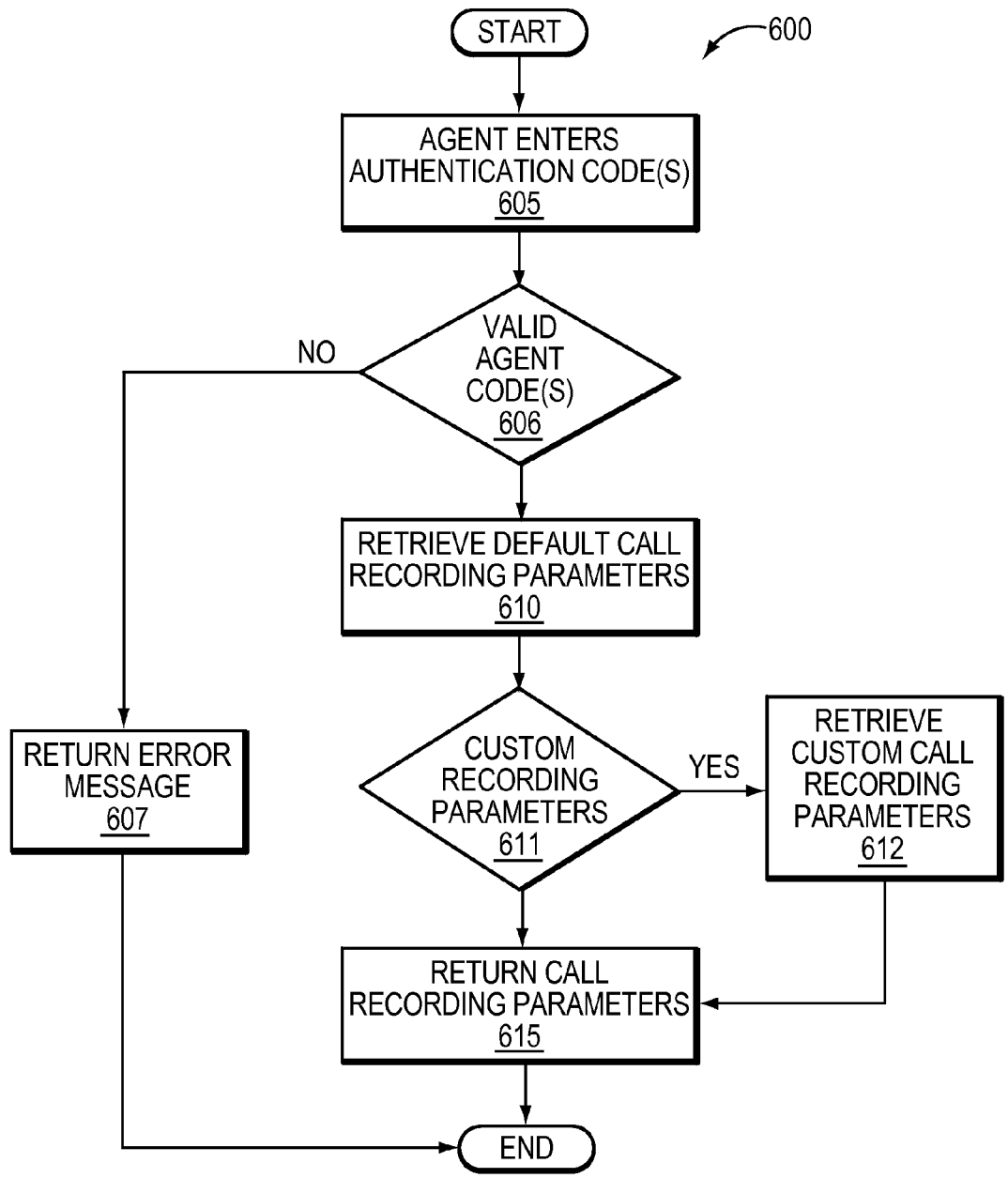
FIGS. 6A-C are flow diagrams illustrating call processing according to a plurality of embodiments.
Figure 6B:
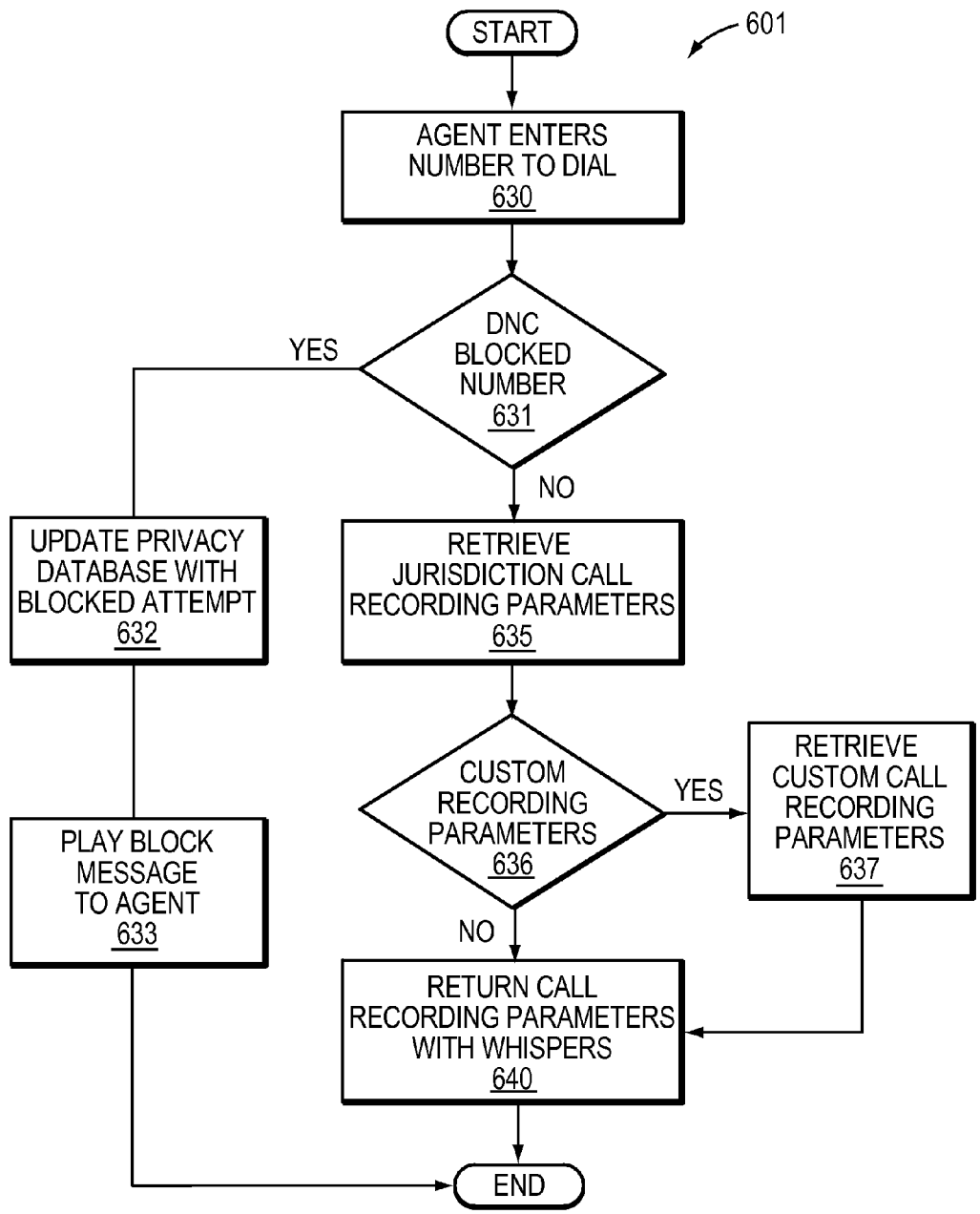
Figure 6C:
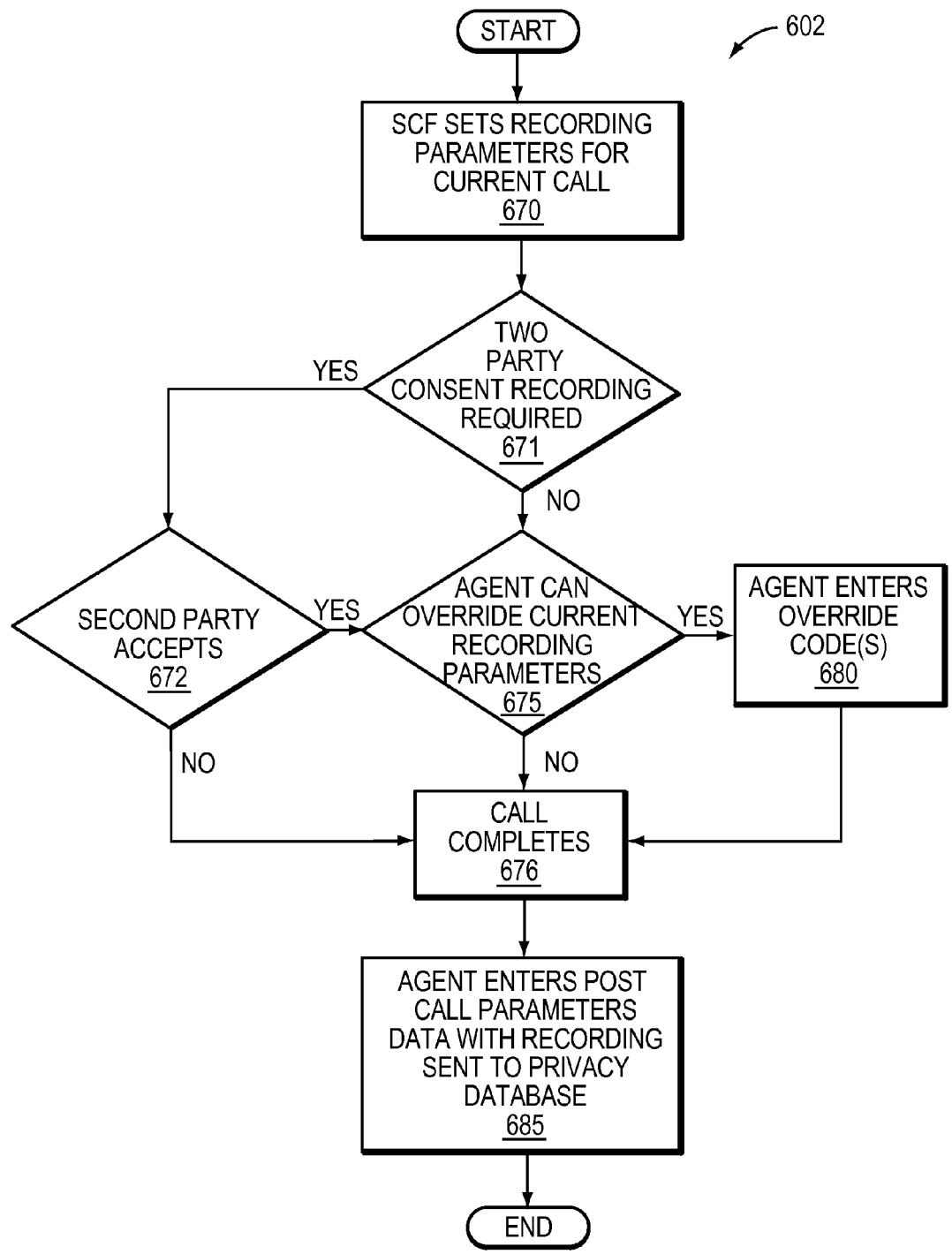

FIGS. 6A-C are flow diagrams illustrating call processing according to a plurality of embodiments. These processes may be implemented in the networks and methods described above with reference to FIGS. 1-5C, configured to operate as described below.

FIG. 6A is a flow diagram of a process 600 by which a calling agent (e.g., a subscribing user initiating a call at an origin) may obtain parameters for recording a call with a given destination as provided in a Privacy database. An agent enters authorization code(s) at a terminal in communication with the Privacy database to authenticate access to the database 605. The agent codes are checked for validity 606, and an error message is returned if the code is invalid 607. If the code is valid, then the Privacy database retrieves a set of default call recording parameters 610. Before returning the parameters to the agent, the Privacy database verifies whether the object entry is associated with custom recording parameters (e.g., a customer preference or exemption to a privacy regulation) 611. If so, those custom parameters are retrieved 612, and a unified set of call recording parameters is returned to the agent 615.

FIG. 6B is a flow diagram of a process 601 by which a calling agent initiates and establishes a call. The agent (at an origin terminal) dials a number to a destination 630. The Privacy database checks whether the number is a DNC blocked number 631. If so, then the Privacy database is updated with the blocked attempt 632, and an audio message is played back to the agent to indicate the block 633. If the number is not blocked, then the Privacy database retrieves recording parameters (e.g., state laws and regulations) associated with the jurisdiction of the destination 635. If there are any custom recording parameters associated with the destination (e.g., a customer preference or exemption to a privacy regulation) 636, then those parameters are retrieved as well 637 to return an accurate set of call recording parameters associated with the destination 640. The call recording parameters may be conveyed to the calling agent via an audio notification or other notice at the origin terminal.

FIG. 6C is a flow diagram of a process 602 by which recording parameters may be implemented in a call. A service control function (SCF), given the recording parameters for a call (e.g., via the process 601 of FIG. 6B), establishes the call under the recording parameters 670. If the parameters require two-party consent to record the call 671, and the second party (e.g., the call recipient at the destination) consents to the recording 672, then the agent may override the initial current recording parameters 675 by entering an override code 680. Upon completion of the call 676, the agent may perform post-call disposition by entering updated call parameter data at the origin terminal 685. The Privacy database receives the call parameter data and updates the call parameters associated with the destination accordingly, such that the updated parameters will be implemented in future calls to the destination.

It should be understood that the block diagram of FIG. 1 and the flow diagrams of FIGS. 2-6C are examples that can include more or fewer components, be partitioned into subunits, or be implemented in different combinations. Moreover, the flow diagrams may be implemented in hardware, firmware, or software. If implemented in software, the software may be written in any software language suitable for use in networks and network devices as illustrated in FIG. 1. The software may be embodied on any form of non-transitory computer readable medium, such as RAM, ROM, or magnetic or optical disk, and loaded and executed by generic or custom processor(s).

While this invention has been particularly shown and described with references to example embodiments thereof, it will be understood by those skilled in the art that various changes in form and details may be made therein without departing from the scope of the invention encompassed by the appended claims.

What is claimed is:

1. A system, having at least one processor, comprising:
a privacy database configured to store call recording rules associated with a plurality of origins and destinations;
a service control function (SCF) configured to selectively establish a call between an origin and a destination based on status and jurisdiction of at least one of the origin and destination indicated in the privacy database, the SCF further configured to provide parameters for the call based on the call recording rules; and
a server configured, responsive to the parameters, to selectively record the call and report an input to update the privacy database;
wherein the SCF is configured to compare at least one of a destination ID and an origin ID against an associated jurisdiction indicated in the privacy database, the parameters being dependent on the comparison.

2. The system of claim 1, wherein the server is further configured, responsive to the parameters, to selectively provide one or more recorded disclosures, before, during or after the call, to one or more parties to the call.

3. The system of claim 2, wherein the recorded disclosures are initiated by user-inputted commands entered at the origin or destination or both before, during or after the call.

4. The system of claim 1, wherein the server is configured as a node of a voice trunk enabling the call.

5. The system of claim 1, wherein the server updates the privacy database automatically based on parameters applied to the call.

6. The system of claim 1, wherein the server updates the privacy database based on the input, the input being a user-entered command at the origin or the destination or both before, during or after the call.

7. The system of claim 6, wherein the input is one of a key press and a recorded voice response.

8. The system of claim 6, wherein the update to the privacy database is one or more call recording data elements, the data elements being one or more of a key press, an electronic signature, recording or text of all or a portion of one or more parties to a call, the user-inputted command, authorization to conduct a transaction, authorization to record a call, and exemptions to call recording, do-not-call or other marketing privacy law.

9. The system of claim 1, wherein the SCF is configured to indicate via a notification, to the origin, the parameters for the call based on at least one of the status and jurisdiction indicated in the privacy database.

10. The system of claim 1, wherein the privacy database update includes an indication of communications preferences alternative to telephone communication for a user associated with one of the origin and destination.

11. The system of claim 1, wherein the server is a component of the SCF.

12. The system of claim 1, wherein the server is responsive to a user-inputted command to initiate recording of the call and delivery of a recorded disclosure to the destination.

13. The system of claim 12, wherein the recording of the call corresponds to at least one of an electronic signature, an exemption to a do-not-call rule, a call recording, and consent to participate in a recorded call.

14. The system of claim 12, further comprising a computer interface at the origin, the computer interface being responsive to user input to provide the command.

15. The system of claim 1, wherein the server is responsive to user-inputted command at the destination to update to the privacy database.

16. The system of claim 1, wherein the privacy database further includes do-not-call (DNC) rules, the SCF applying treatment for the call based on at least one of status and jurisdiction of the destination indicated in the DNC rules.

17. The system of claim 16, wherein the input to update the privacy database includes information to update the DNC rules.

18. The system of claim 17, wherein the information is at least one of a recorded authorization, electronic signature, express written permission, authorization to conduct a transaction, a preference, an exemption to DNC rules, an exemption to pre-recorded or automated voice rules, and an exemption to automated dialing equipment rules.

19. The system of claim 1, wherein the SCF is a service control point (SCP) operating in a signaling system #7 (SS7) network.

20. The system of claim 1, wherein the SCF is a call service control function (CSCF) operating in an IP Multimedia Subsystem (IMS) network.

21. The system of claim 1, wherein the SCF is a GSM service control function (gsmSCF) operating in a wireless network.

22. The system of claim 1, further including a data repository configured to store a recording of the call.

23. The system of claim 22, wherein the data repository is a component of the privacy database.

24. The system of claim 1, further comprising a customer relationship management (CRM) database, the CRM database configured to update information related to a customer or prospect on a list based on call information provided by the privacy database.

25. The system of claim 24, wherein the server delivers a link to an audio or text file to the CRM database.

26. The system of claim 1, wherein the origin includes automated dialing equipment.

27. The system of claim 1, wherein the server records audio input at the origin absent audio input at the destination.

28. The system of claim 1, wherein the server records audio input at the destination absent audio input at the origin.

29. The system of claim 1, wherein the server records audio input at the origin and the destination.

30. The system of claim 1, wherein the SCF is a call service control function (CSCF) operating in a Long Term Evolution (LTE) network.

31. The system of claim 1, wherein the SCF is a node in a communications network.

32. A system, having at least one processor, comprising:
a privacy database configured to store call recording rules associated with a plurality of origins and destinations;
a service control function (SCF) configured to selectively establish a call between an origin and a destination based on status and jurisdiction of at least one of the origin and destination indicated in the privacy database, the SCF further configured to provide parameters for the call based on the call recording rules; and
a server configured, responsive to the parameters, to selectively record the call and report an input to update the privacy database;
wherein the SCF is configured to compare a destination ID against the privacy database to determine subscription status of the destination, the parameters being dependent on the comparison.

33. The system of claim 32, wherein the SCF is configured to compare a destination ID against an associated jurisdiction indicated in the privacy database, the parameters being dependent on the comparison.

34. The system of claim 32, wherein the SCF is configured to compare an origin ID against an associated jurisdiction indicated in the privacy database, the parameters being dependent on the comparison.

35. The system of claim 32, wherein the SCF is configured to compare a destination ID and an origin ID against an associated jurisdiction indicated in the privacy database, the parameters being dependent on the comparison.

36. A system, having at least one processor, comprising:
a privacy database configured to store call recording rules associated with a plurality of origins and destinations;
a service control function (SCF) configured to selectively establish a call between an origin and a destination based on status and jurisdiction of at least one of the origin and destination indicated in the privacy database, the SCF further configured to provide parameters for the call based on the call recording rules; and
a server configured, responsive to the parameters, to selectively record the call and report an input to update the privacy database;
wherein the SCF is configured to compare an origin ID against the privacy database to determine subscription status of the origin, the parameters being dependent on the comparison.

37. A method, implemented by at least one processor, comprising:
receiving a call request from an origin, the call request having a destination identifier (ID);
comparing at least one of the origin and a destination against a corresponding status and jurisdiction indicated in a privacy database;
based on the comparison, selectively establishing a call between the origin and destination;
providing parameters for the call based on call recording rules stored at the privacy database; and
based on the parameters, selectively recording the call and reporting an input to update the privacy database;
wherein the comparison includes comparing at least one of the destination ID and an origin ID against an associated jurisdiction indicated in the privacy database, the parameters being dependent on the comparison.

38. The method of claim 37, further comprising, responsive to the parameters, selectively providing one or more recorded disclosures, before, during or after the call, to one or more parties to the call.

39. The method of claim 38, wherein the recorded disclosures are initiated by user-inputted commands entered at the origin or destination or both before, during or after the call.

40. The method of claim 37, further comprising configuring a node of a voice trunk enabling the call to selectively record the call.

41. The method of claim 37, further comprising updating the privacy database automatically based on parameters applied to the call.

42. The method of claim 37, further comprising updating the privacy database based on the input, the input being a user-entered command at the origin or the destination or both before, during or after the call.

43. The method of claim 42, wherein the input is one of a key press and a recorded voice response.

44. The method of claim 42, wherein the update to the privacy database is one or more call recording data elements, the data elements being one or more of a key press, an electronic signature, recording or text of all or a portion of one or more parties to a call, the user-inputted command, authorization to conduct a transaction, authorization to record a call, and exemptions to call recording, do-not-call or other marketing privacy law.

45. The method of claim 37, further comprising indicating via a notification, to the origin, the parameters for the call based on at least one of the status and jurisdiction indicated in the privacy database.

46. The method of claim 37, further comprising updating the privacy database to include an indication of communications preferences alternative to telephone communication for a user associated with one of the origin and destination.

47. The method of claim 37, wherein a common node selectively establishes the call and selectively records the call.

48. The method of claim 37, further comprising initiating the recording and delivery of a recorded disclosure to the destination responsive to a user-inputted command.

49. The method of claim 48, wherein the recording of the call corresponds to at least one of an electronic signature, an exemption to a do-not-call rule, a call recording, and consent to participate in a recorded call.

50. The method of claim 48, further comprising receiving the input at a computer interface at the origin.

51. The method of claim 37, further comprising updating the privacy database in response to a user-inputted command at the destination.

52. The method of claim 37, wherein the privacy database includes do not call (DNC) rules, and further comprising applying treatment for the call based on at least one of status and jurisdiction of the destination indicated in the DNC rules.

53. The method of claim 52, wherein the input to update the privacy database includes information to update the DNC rules.

54. The method of claim 53, wherein the information is at least one of a recorded authorization, electronic signature, express written permission, authorization to conduct a transaction, a preference, an exemption to DNC rules, an exemption to pre-recorded or automated voice rules, and an exemption to automated dialing equipment rules.

55. The method of claim 37, wherein a service control point (SCP) operating in a signaling system #7 (SS7) network is configured to selectively establish the call.

56. The method of claim 37, wherein a call service control function (CSCF) operating in an IP Multimedia Subsystem (IMS) network is configured to selectively establish the call.

57. The method of claim 37, wherein a GSM service control function (gsmSCF) operating in a wireless network is configured to selectively establish the call.

58. The method of claim 37, further comprising storing a recording of the call to a data repository.

59. The method of claim 5, wherein the data repository is a component of the privacy database.

60. The method of claim 37, further comprising updating information related to a customer or prospect on a list based on call information provided by the privacy database to a customer relationship management (CRM) database.

61. The method of claim 60, further comprising delivering a link to an audio or text file to the CRM database.

62. The method of claim 37, wherein the origin includes automated dialing equipment.

63. The method of claim 37, further comprising recording audio input at the origin absent audio input at the destination.

64. The method of claim 37, further comprising recording audio input at the destination absent audio input at the origin.

65. The method of claim 37, further comprising recording audio input at the origin and the destination.

66. A method, implemented by at least one processor, comprising:

receiving a call request from an origin, the call request having a destination identifier (ID);

comparing at least one of the origin and a destination against a corresponding status and jurisdiction indicated in a privacy database;

based on the comparison, selectively establishing a call between the origin and destination;

providing parameters for the call based on call recording rules stored at the privacy database;

based on the parameters, selectively recording the call and reporting an input to update the privacy database; and comparing the destination ID against the privacy database to determine subscription status of the destination, the parameters being dependent on the comparison.

67. The method of claim 66, further comprising comparing the destination ID against an associated jurisdiction indicated in the privacy database, the parameters being dependent on the comparison.

68. The method of claim 66, further comprising comparing an origin ID against an associated jurisdiction indicated in the privacy database, the parameters being dependent on the comparison.

69. The method of claim 66, further comprising comparing the destination ID and an origin ID against an associated jurisdiction indicated in the privacy database, the parameters being dependent on the comparison.

70. A method, implemented by at least one processor, comprising:

receiving a call request from an origin, the call request having a destination identifier (ID);

comparing at least one of the origin and a destination against a corresponding status and jurisdiction indicated in a privacy database;

based on the comparison, selectively establishing a call between the origin and destination;

providing parameters for the call based on call recording rules stored at the privacy database;

based on the parameters, selectively recording the call and reporting an input to update the privacy database; and comparing an origin ID against the privacy database to determine subscription status of the origin, the parameters being dependent on the comparison.

\* \* \* \* \*

UNITED STATES PATENT AND TRADEMARK OFFICE
CERTIFICATE OF CORRECTION

PATENT NO.        : 8,572,113 B2  
APPLICATION NO.   : 12/874864  
DATED             : October 29, 2013  
INVENTOR(S)       : Keith A. Fotta et al.

Page 1 of 1

It is certified that error appears in the above-identified patent and that said Letters Patent is hereby corrected as shown below:

In the Claims

In Column 18, Claim 59, line 50, delete "5" an insert --58--.

Signed and Sealed this
Seventh Day of January, 2014

Margaret A. Focarino
*Commissioner for Patents of the United States Patent and Trademark Office*